US007929283B2

(12) United States Patent
Wang

(10) Patent No.: US 7,929,283 B2
(45) Date of Patent: Apr. 19, 2011

(54) ELECTRONIC DEVICE WITH DETACHABLE KEYBOARD

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 102 days.

(21) Appl. No.: 12/421,719

(22) Filed: Apr. 10, 2009

(65) Prior Publication Data

US 2010/0039761 A1    Feb. 18, 2010

(30) Foreign Application Priority Data

Aug. 15, 2008    (CN) .......................... 2008 1 0303857

(51) Int. Cl.
*G06F 1/16* (2006.01)
(52) U.S. Cl. ................................................. 361/679.17
(58) Field of Classification Search ............... 361/679.17
See application file for complete search history.

(56) References Cited

U.S. PATENT DOCUMENTS

| 6,215,419 | B1 * | 4/2001 | Leman | 341/22 |
|---|---|---|---|---|
| 7,385,808 | B2 * | 6/2008 | Hamada et al. | 361/679.09 |
| 7,643,278 | B2 * | 1/2010 | Hou | 361/679.17 |
| 2002/0085338 | A1 * | 7/2002 | Lin | 361/680 |
| 2005/0018391 | A1 * | 1/2005 | Jin | 361/680 |
| 2007/0133160 | A1 * | 6/2007 | Ma | 361/683 |
| 2008/0133803 | A1 * | 6/2008 | Liu et al. | 710/64 |
| 2008/0144262 | A1 * | 6/2008 | Lai | 361/680 |

FOREIGN PATENT DOCUMENTS

CN    101131595 A    2/2008

* cited by examiner

*Primary Examiner* — Lisa Lea-Edmonds
(74) *Attorney, Agent, or Firm* — Clifford O. Chi

(57) ABSTRACT

An electronic device includes a main body, a keyboard, a fastening member, and an elastic member. The main body defines an assembling groove. The keyboard is disposed in the assembling groove of the main body. The fastening member is movably disposed in the main body. The elastic member is sleeved on the fastening member, and configured for producing an elastic force to drive the fastening member to engage with the main body.

18 Claims, 4 Drawing Sheets

ELECTRONIC DEVICE WITH DETACHABLE KEYBOARD

BACKGROUND

1. Technical Field

The present disclosure relates generally to electronic devices and, more particularly, to an electronic device with a detachable keyboard.

2. Description of Related Art

Notebook computers have become popular alternatives to desktop computers because of their portability. A typical notebook computer includes a display body and a main body. The display body is rotatably attached to the main body so that the display body can be opened and closed relative to the main body. The main body has a housing, a keyboard module, and a circuit board. The circuit board is disposed in the housing. The keyboard module is generally fixed to the housing.

However, if the keyboard of the typical notebook computer malfunctions and need to be repaired or replaced, disassembling and removing the keyboard module from the housing is difficult because the keyboard module is fixed to the housing. In addition, when operating the notebook computer one can at most be an arm's length away from the notebook computer to reach and operate the keyboard module. At such a close distance to a notebook computer screen is not good for one's eyes.

Therefore, an electronic device which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
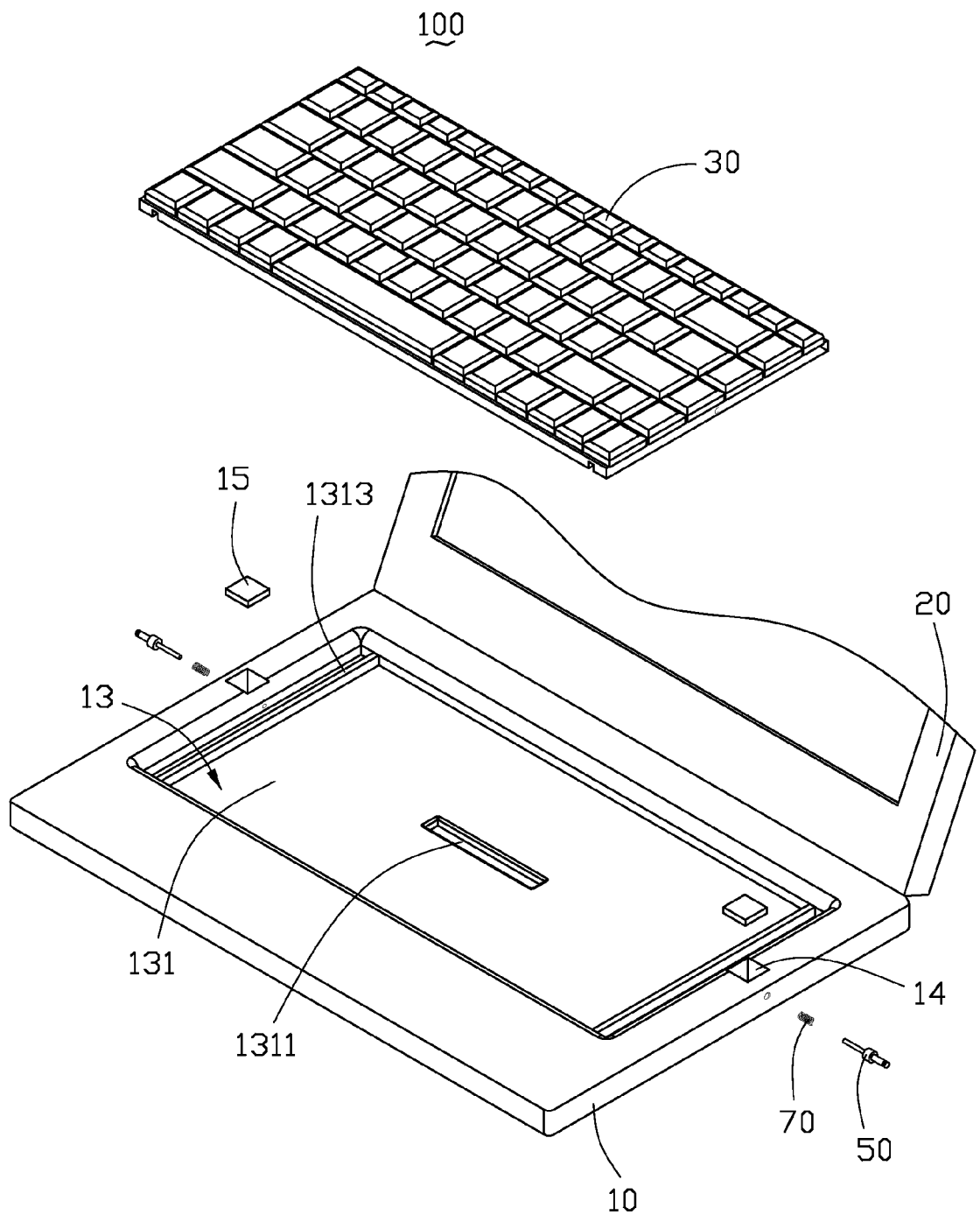
FIG. 1 is an exploded, isometric view of an embodiment of an electronic device, the electronic device including a main body, a display body, a keyboard, a fastening member, and an elastic member.

Referring to FIG. 1, an embodiment of a notebook computer 100 includes a main body 10, a display body 20, a keyboard 30, two fastening members 50, and two elastic members 70. The display body 20 is rotatably connected to the main body 10.

The main body 10 defines an assembling groove 13 in a middle, and two receiving grooves 14 on opposite sides. A base wall 131 in the assembling groove 13 defines an universal serial bus (USB) socket 1311 in a center portion thereof. Two positioning portions 1313 are formed on opposite sides of the base wall 131. In the illustrated embodiment, the USB socket 1311 is rectangular shaped, and the positioning portions 1313 are elongated rectangular strips protruding out of the assembling groove 13. The main body 10 further includes two covers 15 configured for engaging in a top of the receiving grooves 14.

Figure 2:
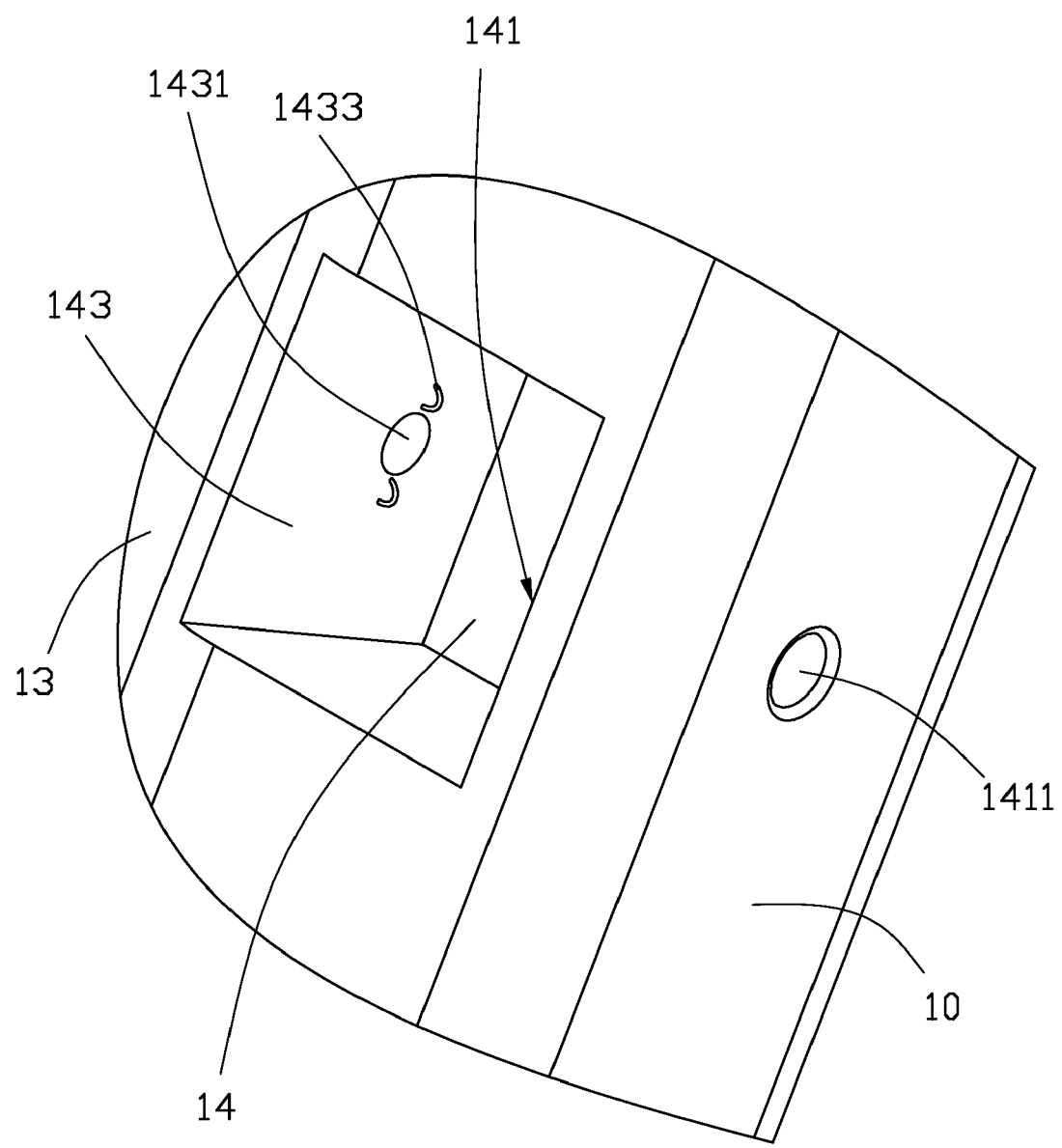
FIG. 2 is a partial, isometric view of the main body of FIG. 1.

Referring to FIG. 2, a first side wall 141 in each receiving groove 14 defines a through hole 1411 communicating with a side surface of the main body 10. A second side wall 143 in each receiving groove 14 opposite to the first side wall 141 defines a through hole 1431 communicating the receiving groove 14 with the assembling groove 13. Two positioning hooks 1433 are formed on the second side wall 143 adjacent to the through hole 1431 of the second side wall 143.

Figure 3:
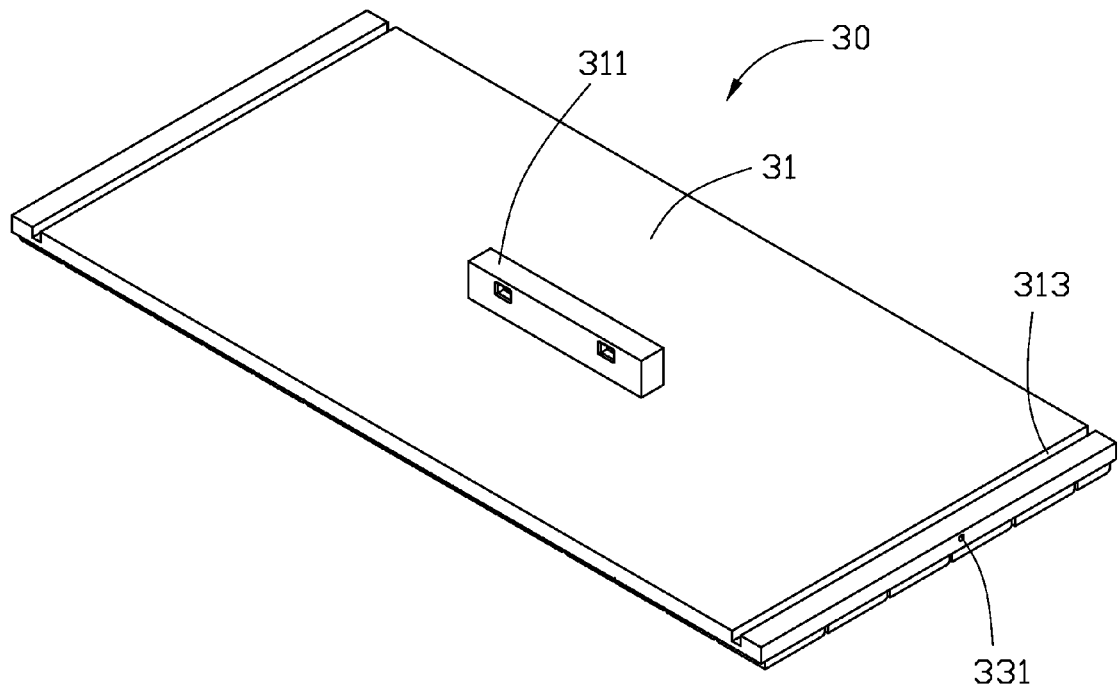
FIG. 3 is an isometric view of the keyboard of FIG. 1, but viewed from another aspect.

Referring to FIG. 3, a plug 311 is formed on a center portion of a bottom surface 31 of the keyboard 30. The plug 311 is configured for engaging with the USB socket 1311, thus electrically connecting the keyboard 30 to the main body 10. Two positioning grooves 313 are defined in opposite sides of the bottom surface 31 of the keyboard 30. The keyboard 30 further defines two connecting holes 331 on opposite side surfaces.

Figure 4:
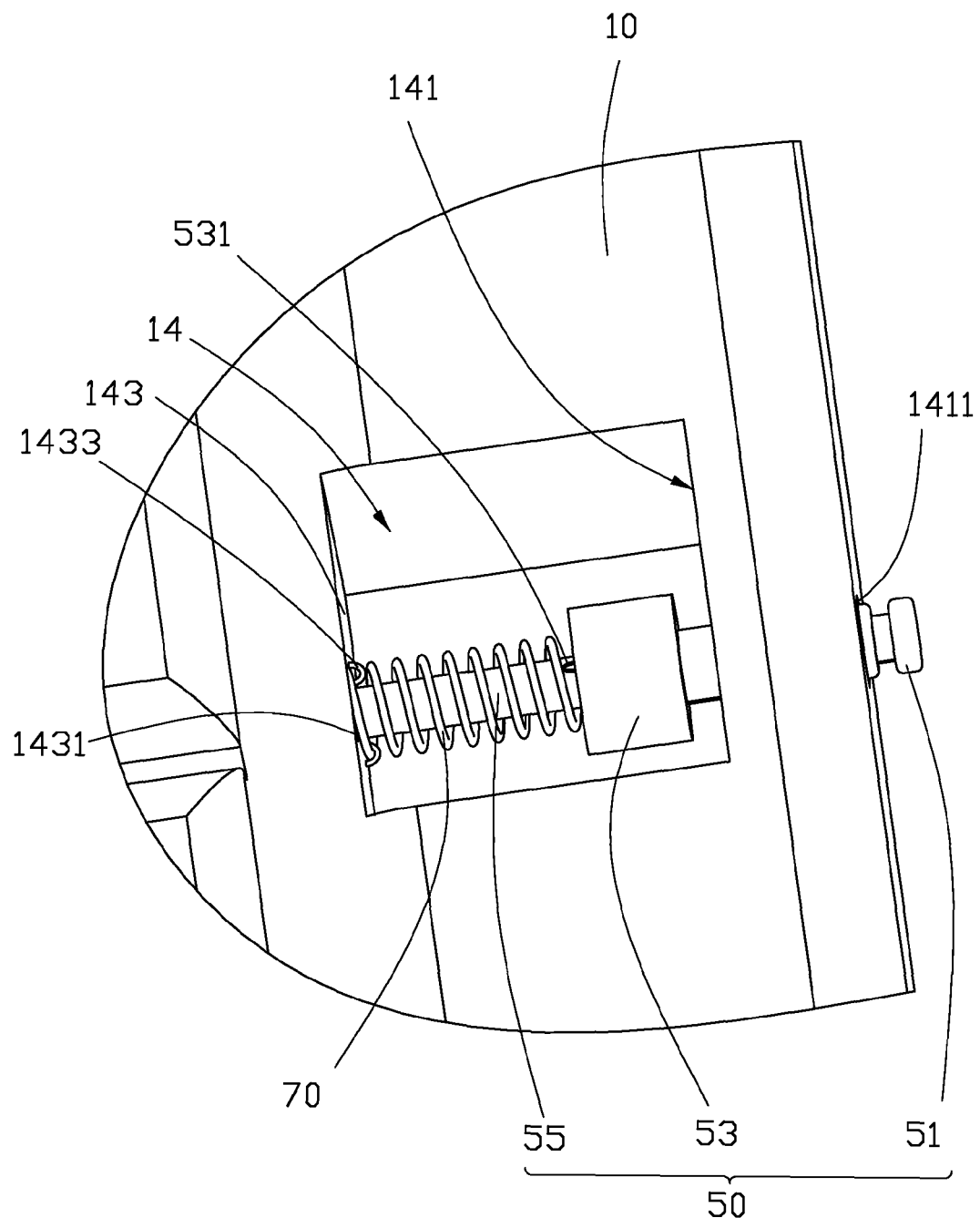
FIG. 4 is a partial, isometric view of the main body assembled with the fastening member and the elastic member of FIG. 1.

Referring to FIG. 4, each fastening member 50 includes a connecting shaft 55, a restricting portion 53, and an operating portion 51. The connecting shaft 55 and the operating portion 51 are disposed on opposite ends of the restricting portion 53. Two positioning hooks 531 are formed on the restricting portion 53 adjacent to the connecting shaft 55. In the illustrated embodiment, the connecting shaft 55 and the operating portion 51 are detachably engaged with the restricting portion 53. The elastic members 70 are springs.

Referring to FIGS. 1 through 4, to assemble the fastening members 50 to the main body 10, the connecting shafts 55 extend through the through holes 1431 of the second side walls 143 and the elastic members 70 from the assembling groove 13, and engage with the restricting portions 53. One end of the elastic members 70 engages with the positioning hooks 1433, and the other end of the elastic members 70 engages with the positioning hooks 531 of the restricting portions 53. The operating portions 51 extend through the through hole 1411 of the first side wall 141, and engage with the restricting portions 53.

To assemble the keyboard 30 to the main body 10, the operating portion 51 of each fastening member 50 is drawn away from the main body 10 until the connecting shaft 55 disengages with the assembling groove 13. The elastic member 70 becomes compressed, and the restricting portion 53 resists the first side wall 141. The keyboard 30 is disposed in the keyboard housing 13. The plug 311 engages in the USB socket 1311, and the positioning portions 1313 engage in the positioning grooves 313. When the connecting shaft 55 is freed, the connecting shaft 55 of each fastening member 50 extends in the connecting holes 331 of the keyboard 30.

To remove the keyboard 30, the fastening members 50 are pulled to allow the keyboard 30 to be removed from the main body 10. A replacement keyboard can be fixedly disposed in the assembling groove 13 by the fastening members 50. Thus, the keyboard 30 can be easily assembled and disassembled from the main body 10. In addition, the keyboard 30 can be separated from the assembling groove 13 and a USB cable can be used to connect the plug 311 of the keyboard 30 to the USB socket 1311. As a result, a user can operate the keyboard 30 at a suitable distance from the display body 20.

It should be pointed out that the notebook computer 200 may include only one fastening member 50 or more than two fastening members 50. The fastening members 50 can also be used in other electronic devices, such as a personal digital assistant. In addition, the connecting shaft 55 of the fastening members 50 can be pushed into the positioning grooves 313 of the keyboard 30 by an external force thereby eliminating the need for the elastic member 70. Alternatively, a plug may be formed on the main body 10, and the keyboard 30 defines a USB socket.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
a main body defining an assembling groove;
a keyboard detachably disposed in the assembling groove of the main body;
at least one fastening member movably disposed in the main body; and
at least one elastic member sleeved on the at least one fastening member, and configured for producing an elastic force to drive the at least one fastening member to engage with the main body.

2. The electronic device of claim 1, wherein the main body defines a universal serial bus (USB) socket; a plug is formed on the keyboard; the plug engages with the USB socket.

3. The electronic device of claim 2, wherein the keyboard defines at least one positioning groove; at least one positioning portion is formed on the main body; the at least one positioning portion engages with the at least one positioning groove.

4. The electronic device of claim 1, wherein the at least one fastening member comprises a connecting shaft, a restricting portion, and an operating portion; the connecting shaft and the operating portion are disposed on opposite ends of the restricting portion.

5. The electronic device of claim 4, wherein the main body further defines at least one receiving groove adjacent to the assembling groove; the restricting portion is received in the at least one receiving groove.

6. The electronic device of claim 5, wherein the main body further comprises at least one cover engaging in a top of the at least one receiving groove.

7. The electronic device of claim 5, wherein the main body further defines a through hole communicating the assembling groove with the at least one receiving groove; the connecting shaft of the at least one fastening member is movably received in the through hole.

8. The electronic device of claim 7, wherein the elastic member is sleeved on the connecting shaft of the at least one fastening member, and received in the receiving groove.

9. The electronic device of claim 8, wherein the elastic member is a spring, one end of the spring is connected to the restricting portion of the fastening member, and the other end of the spring is connected to the main body.

10. The electronic device of claim 8, wherein the keyboard defines at least one connecting hole; the connecting shaft of the at least fastening member engages with the at least one connecting hole.

11. The electronic device of claim 1 being a notebook computer.

12. An electronic device, comprising:
a main body defining as assembling groove;
a keyboard disposed in the main body and defining at least one connecting hole; and
at least one fastening member movably disposed in the main body, the at least one fastening member having a connecting shaft capable of engaging with the connecting hole of the keyboard.

13. The electronic device of claim 12, wherein the main body defines a USB socket; a plug is formed on the keyboard; the plug engages with the USB socket.

14. The electronic device of claim 13, wherein the keyboard defines at least one positioning groove; at least one positioning portion is formed on the main body; the at least one positioning portion engages with the at least one positioning groove.

15. The electronic device of claim 12, wherein the at least one fastening member comprises a connecting shaft, a restricting portion, and an operating portion; the connecting shaft and the operating portion are disposed on opposite ends of the restricting portion.

16. The electronic device of claim 15, wherein the main body further defines at least one receiving groove adjacent to the assembling groove; the restricting portion is received in the at least one receiving groove.

17. The electronic device of claim 16, wherein the main body further defines a through hole communicating the assembling groove with the at least one receiving groove; the connecting shaft of the at least one fastening member is movably received in the through hole.

18. The electronic device of claim 17, wherein the keyboard defines at least one connecting hole; the connecting shaft of the at least fastening member engages with the at least one connecting hole.

* * * * *